(12) United States Patent
Spriestersbach (10) Patent No.: US 7,606,583 B2
(45) Date of Patent: Oct. 20, 2009

(54) AUTOMATED GENERATION OF CONTEXT INFORMATION

(75) Inventor: Axel Spriestersbach, Karlsruhe (DE)

(73) Assignee: SAP AG, Walldorf (DE)

( * ) Notice: Subject to any disclaimer, the term of this patent is extended or adjusted under 35 U.S.C. 154(b) by 523 days.

(21) Appl. No.: 11/395,713

(22) Filed: Mar. 31, 2006

(65) Prior Publication Data

US 2007/0232323 A1 Oct. 4, 2007

(51) Int. Cl.
*H04W 24/00* (2006.01)
(52) U.S. Cl. .................. 455/456.1; 455/414.2
(58) Field of Classification Search .......... 455/456, 455/414, 414.2
See application file for complete search history.

(56) References Cited

U.S. PATENT DOCUMENTS

| | | | |
|---|---|---|---|
| 6,424,840 B1 * | 7/2002 | Fitch et al. | 455/456.1 |
| 6,611,751 B2 | 8/2003 | Warren | |
| 6,728,545 B1 * | 4/2004 | Belcea | 455/456.2 |
| 6,938,038 B2 | 8/2005 | Weinberg et al. | |
| 2004/0067759 A1 * | 4/2004 | Spirito et al. | 455/456.1 |
| 2005/0164725 A1 | 7/2005 | Naito et al. | |
| 2005/0222908 A1 | 10/2005 | Altberg et al. | |
| 2005/0227739 A1 | 10/2005 | Dowling et al. | |
| 2005/0246367 A1 | 11/2005 | Rath | |
| 2005/0246390 A1 | 11/2005 | House et al. | |

FOREIGN PATENT DOCUMENTS

| | | |
|---|---|---|
| CA | 2443558AA | 10/2002 |
| EP | 1246488 A1 | 10/2002 |
| JP | 2001306604 A2 | 11/2001 |
| WO | WO-0133825 A1 | 5/2001 |
| WO | WO-0135683 A1 | 5/2001 |
| WO | WO-0174034 A2 | 10/2001 |
| WO | WO-0191411 A1 | 11/2001 |
| WO | WO-03046709 A1 | 6/2003 |

(Continued)

OTHER PUBLICATIONS

Lara, Walter , "Universal Location Framework: A New Wireless Building Block", *Developer Update (periodical)*; http://www.intel.com/technology/magazine/communications/wi02031.pdf, Lara: Senior Software Engineer, Emerging Platforms Lab, Intel Corporation,(Feb. 2003),7 pgs.

(Continued)

*Primary Examiner*—Lester Kincaid
*Assistant Examiner*—Daniel Lai
(74) *Attorney, Agent, or Firm*—Schwegman, Lundberg & Woessner, P.A.

(57) ABSTRACT

A method includes determining geographic coordinates of a plurality of entities, the plurality of entities including a first set of entities that have each been associated with a respective context information item and a second set of entities that have each not been associated with a respective context information item. The geographic coordinates of the first set of entities are used to identify geographic coordinates located within a first geographic area associated with a first context information item. The geographic coordinates of the second set of the entities are used to identify a first entity of the second set of entities that is located within the first graphic area associated with the first context information item. The first entity is associated with the first context information item.

23 Claims, 7 Drawing Sheets

FOREIGN PATENT DOCUMENTS

WO     WO-03054654 A2     7/2003

OTHER PUBLICATIONS

Rao, Bharat, et al., "Evolution of Mobile Location-based Services", http://www.soc.staffs.ac.uk/kch1/teaching/undergraduate/mc/schedule/lectures/week_11/p61-rao.pdf, (Dec. 2003),5 pgs.

Spriestersbach, A , et al., "Integrating context information into enterprise applications for the mobile workforce—a case study", http://elara.tk.informatik.tu-darmstadt.de/Publications/2001/mobicom2001.pdf, International Workshop on Mobile Commerce archive Proceedings of the 1st international workshop on Mobile commerce; Rome, Italy,(2001),55-59.

Trevisani, Emiliano , et al., "Cell-ID location technique, limits and benefits: an experimental study", University of Rome "La Sapienza",(observed Dec. 12, 2005),18 pgs.

Vasileios, Zeimpekis , et al., "A Taxonomy of Indoor and Outdoor Positioning Techniques for Mobile Location Services", http://www.eltrun.aueb.gr/papers/Zeimpekis_et_al_fin.pdf, Athens University of Economics and Business, Department of Management Science & Technology,(observed Dec. 12, 2005),9 pgs.

"International Patent Application No. 07002855.0-2221 Extended European Search Report mailed Sep. 25, 2007", 7 pgs.

\* cited by examiner

AUTOMATED GENERATION OF CONTEXT INFORMATION

FIELD

This application relates to a method and system automatically to generate context information and, in an example embodiment, to a method and system to utilize such generated context information to process data of a business application

BACKGROUND

A location-based service (or LBS) is a cellular telephone network service that may be provided to a subscriber based on a current geographical location. Current geographical position of a user may be determined by user entry or a GPS receiver carried by the user, for example. Alternatively, a radiolocation function may be built into the cellular network or a handset may use triangulation between the known geographic coordinates of the base stations through which communication takes place. Knowledge of the coordinates of base stations is owned and controlled by the network operator, and is generally not available to the end user or an organization with which the end-user is associated.

Examples of location based services might include finding a nearby restaurant. The ability to provide context awareness (e.g., location awareness) may also be used to improve the usability of mobile applications. For example, a list of friends or customers within a given range may be provided to an end user, if the location of the end user that is accessing a system (e.g., a cellular telephone system) can be determined. Currently, the determination of the location of the end-user is possible utilizing direct Global Positioning Service (GPS) accesses, which require a GPS receiver to be attached to the mobile devices and an ability to access GPS data (e.g. via a Java application). The determination of the location of an end-user is also possible utilizing, for example, GSM cellular identifier (Cell ID) triangulation, based on the signal strength for signal propagation delay.

The use of triangulation provides a number of disadvantages. First, the triangulation compilation has to be performed on the device (e.g., a mobile device, such as a cellular telephone) or needs to be provided as a service in a cellular network. Accordingly, the performance of the triangulation compilation requires the mobile device to provide sufficient computing power, or results in an increase in cellular network traffic. Secondly, the GPS coordinates of the base stations corresponding to particular cellular identifiers need to be known to perform a triangulation calculation. Typically, the coordinates associated with a particular cellular base station (and accordingly a cellular identifier) are known only to an operator of the cellular network.

SUMMARY

According to an example aspect, there is provided a method that includes determining geographic coordinates of a plurality of entities, the plurality of entities including a first set of entities that have each been associated with a respective context information item and a second set of entities that have each not been associated with a respective context information item. The geographic coordinates of the first set of entities are used to identify geographic coordinates located within a first geographic area associated with a first context information item. The geographic coordinates of the second set of the entities are used to identify a first entity of the second set of entities that is located within the first geographic area associated with the first context information item. The first entity is associated with the first context information item.

Other features will be apparent from the accompanying drawings and from the detailed description that follows.

BRIEF DESCRIPTION OF DRAWINGS

Embodiments are illustrated by way of example and not limitation in the figures of the accompanying drawings, in which like references indicate similar elements and in which.

DETAILED DESCRIPTION

In the following description, for purposes of explanation, numerous specific details are set forth in order to provide a thorough understanding of an embodiment of the present invention. It will be evident, however, to one skilled in the art that the present invention may be practiced without these specific details.

An example embodiment described herein provides for methods and systems that enable the attaching (or otherwise associating) of context information with any one of a number of types of data objects, entities or instances. For the purposes of illustration, business objects (e.g., customer objects, product objects, project objects etc.) are discussed below as examples of data objects. It should be appreciated, however, that the described technologies are equally applicable to any type of data object, entity or instances.

The associating of context information with data objects may, for example, increase the usability of context-aware applications (e.g., mobile applications executing on a mobile device). One example of context information that may be associated with a business object is geographic location information, which can be utilized to provide functions and services in a location-aware manner. For example, consider that a particular mobile business application requires information identifying a particular business object (e.g., a customer). Consider that, where the mobile business application is an order processing application, the application may require a user in the field (e.g., sales representative) to enter a customer identifier identifying a particular customer to which an order pertains. For a large company with a substantial client base, a list of potential customers from which a sales representative is required to select may be large. Accordingly, it may be impractical for the mobile application to present a list of customers, from which the sales representative can choose, in a convenient manner. This is particularly true on a small display of a mobile device on which the mobile business application may be executing. In one embodiment, a reduction in the number of customer identifiers presented to a sales representative for selection may be achieved, thus increasing the usability of the mobile business application. Of course, similar benefits may be achieved in connection with other business objects, such as products and projects, or recreational objects, such as restaurants or any other points of interest within a geographic area. For example, where the mobile application requires user input (e.g., by selection from a menu) of a product identifier, embodiments may be utilized to limit a selection of products presented to a user to only those products that are used or available at a specific location (e.g., at a certain plant). Similarly, where a business object is a project, example embodiments may be utilized to restrict a list of project identifiers, presented to a mobile application user, to projects that are performed at a certain customer location.

In certain instances, the selection of entities (e.g., business objects) associated with a particular context (e.g., a location) does not require pinpoint accuracy. In these situations, utilizing a wireless network identifier (e.g., cellular identifier (Cell-ID)) may be sufficient to enable, in an example embodiment, the retrieval of context to match certain context-aware business objects. Cellular identifiers (Cell-IDs) are unique identifiers that may be assigned, by an operator of a cellular network, to a mobile base station (e.g., a GSM base station). Mobile devices (e.g., cellular telephones) typically communicate via a base station with the strongest signal, and the cellular identifier of the base station through which a mobile device is communicating may be included in transmissions from the mobile device, via the relevant base station. While embodiments are discussed herein as utilizing cellular identifiers, it will be appreciated that in other embodiments any wireless network identifiers (e.g., associated with a certain area) may similarly be utilized. For example, in a wireless local area network (WLAN) or a Wifi network, a service set identifier (SSID) may be used to implement embodiments.

It will be appreciated that a cellular identifier (Cell-ID) may be utilized to determine (or confirm) the location of a mobile device within a coverage range of the relevant base station. In one embodiment, a coverage identifier, in the example form of a Cell- ID, is utilized to determine the presence of a mobile device within a coverage area of a mobile base station. Further, to enable the identification of data entities (e.g., a context-dependent business object), in an example embodiment a location identifier (e.g., Cell-ID) is assigned to (up or otherwise associated with) a business object, and transmitted from the mobile device to a server-based application.

The assignment of a cellular identifier to each data entity of a large number of data entities (e.g., business objects) is technically challenging. One manner in which this may be achieved is by using explicit measurement of a cellular identifier (Cell-ID) for every data entity. For example, a person may be physically deployed to the location at which a data entity (e.g., customer, restaurant, etc) is physically located, the person then being required to transmit an appropriate data entity identifier, in association with a Cell-ID, from the relevant location. This transmitted data may then be captured in an appropriate database. However, as noted above, when dealing with a large population of data entities (e.g., restaurants within a specific geographic region), this may be logistically difficult to achieve.

An example embodiment, as discussed in more detail below, provides for an automated method by which context information (e.g., location information) may be automatically generated for an entity (e.g., a customer, product, project, restaurant etc.). While, in the described example embodiment, the context information is described as being a cellular identifier (Cell-ID), it will be appreciated that any context information may be automatically generated and associated with an entity.

In one example embodiment, a method and system as described herein may utilize context-enhanced entity data, in the form of cellular identifier (Cell-ID) enhanced business objects, to deliver context aware services. In one embodiment, for a software application to utilize cellular identifier (Cell-ID) enhanced business objects, a mobile application client sends a cellular identifier as part of an initial request to a server-based application that has access to a database that stores associations between business objects and Cell-IDs. The transmission of such a request may, in an example embodiment, be performed by a mobile application in the form of a Java 2 Platform Micro Edition (J2ME) application that determines a cellular identifier for a mobile base station with which a mobile device is communicating, when at a location of the relevant business object. In a further embodiment, the cellular identifier may be determined on the server side if the relevant service provider includes the relevant cellular identifier in communications transmitted to a receiver.

A Cell-ID, included in the initial request to the server side component of a business application, may then be compared to relevant business objects (e.g., customers) and those business objects that have corresponding or matching cellular identifiers (Cell-IDs) are processed (e.g., by being selected for communication to the mobile component of the business application, or by being prioritized).

In order to associate cellular identifiers (Cell-IDs) with at least a subset of business objects within an application database, the business application (e.g., the mobile component thereof) may include a cellular identifier (Cell-ID) together with a business object identifier (e.g., a customer ID) in a communication to the server component of the business application. For example, where a user is utilizing a sales order application, the mobile component of the application may require a sales representative to enter a customer identifier into a form. This customer identifier may then be communicated to the server component of the application, together with the cellular identifier (Cell-ID) as captured by the mobile component of the application. This information may then be utilized by the server component to supplement a business object (e.g., a customer record) with the cellular identifier (Cell-ID) for that customer.

It will be appreciated that the above assignment of a cellular identifier (Cell-ID) to a business object requires that the communication of the customer identifier, for example, occur from a physical location of the relevant customer. In one example embodiment, the relevant business application may assume that the user is physically present at a location associated with a particular business object. Alternatively, in another embodiment, the relevant business application, prior to receiving information identifying a business object, may prompt a user to determine whether the relevant user is physically present at a location of the business object. If so, the mobile component of the application may then determine the cellular identifier (Cell-ID) of a base station with which a mobile device is communicating, and include that cellular identifier (Cell-ID) in a communication transmitted from the mobile device, thereby to enable the business application to associate the cellular identifier (Cell-ID) with the business object in an appropriate database.

As noted above, to associate each entity data record (e.g., business object) within a database (or other data store) with context information (e.g., location information, such as a Cell-ID) may be achieved by capturing context information at a physical location associated with an entity and transmitting that context information, together with entity identifier information, to an association system to store the context information in association with the entity identification information. However, the logistical challenges in generating such communications (or transmissions) may be substantial.

Further details of various example embodiments will now be described with reference to the attached figures.

Figure 1:
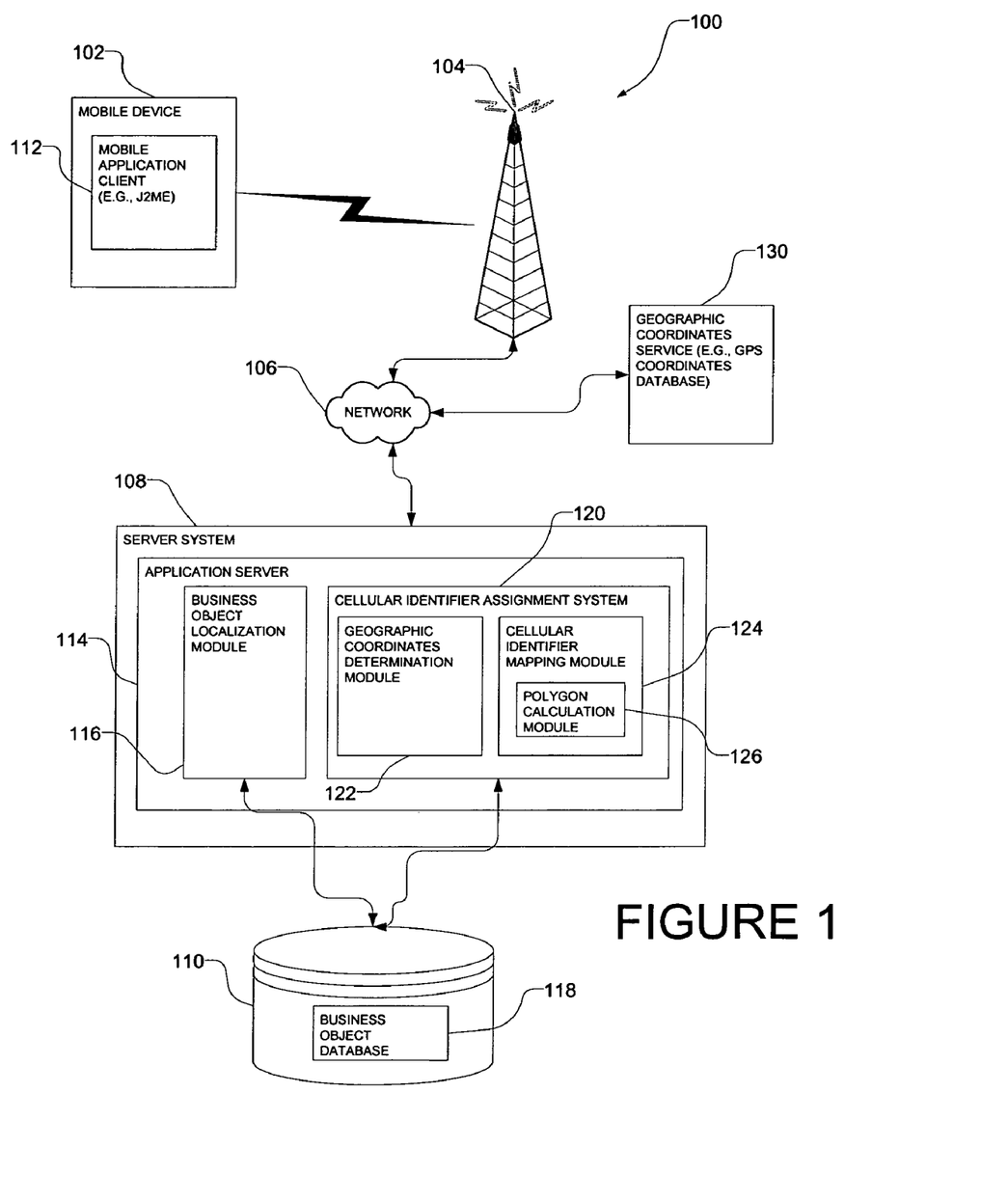
FIG. 1 is a schematic diagram illustrating a system, according to an example embodiment, to automatically generate context information for an entity, represented by a data entity such a business object

FIG. 1 is a schematic diagram illustrating a system 100, according to an example embodiment, to automatically generate context information for an entity, represented by a data entity such as a business object. The system 100 is shown to include a mobile device 102 (e.g., a cellular telephone, Personal Digital Assistant (PDA) or the like) that communicates wirelessly with a mobile base station 104. The mobile base station 104 is in turn coupled via a network 106 (e.g., the Internet) to a server system 108 that operationally accesses a data store, in the example form of a database 110. The mobile device 102 and the server system 108 respectively host components of a software application, such as a business application. Specifically, the mobile device 102 hosts a mobile application client 112 (e.g., in the form of a J2ME application) that communicates with, and provides a front-end to, an application server 114 hosted on the server system 108.

In an example embodiment, the business application may be a sales and order processing application, with the mobile application client 112 enabling sales representatives in the field to enter orders into the application while at a customer site. In this case, the application server 114 is the order processing component of the sales and order processing application, and may perform any one of a number of backend functions to support an order process.

The application server 114 is shown to include, inter alia, a business object localization module 116, which operates to deliver context-enhanced information and services to the mobile application client 112

The business object localization module 116 is supported by a cellular identifier assignment system 120, which operates to assign context information, in example form of cellular identifiers (Cell-IDs)), to entities, in the example form of business objects. These assignments are performed using (1) actual context information included in communications received from mobile devices located in the field, and (2) inferred context information that is derived in the manner described below.

Specifically, in order to infer context information that may be applicable to a specific entity, the business object localization module 116 includes a geographic coordinates determination module 122 and a cellular identifier mapping module 124. The geographic coordinates determination module 122 operationally determines location information (e.g., geographic coordinates) for business objects stored within a business objects database 118 of the database 110. To this end, the geographic coordinates determination module 122 may have access, via the network 106, to a geographic coordinates service 130 (e.g., a publicly accessible GPS coordinates database) from which geographic coordinates may be retrieved utilizing the physical address of an entity. Accordingly, the geographic coordinates determination module 122 may query the geographic coordinates service 130 with a physical address, responsive to which the geographic coordinates service 130 provides a response including geographic coordinates (e.g., GPS coordinates) at which the physical address is located.

The cellular identifier mapping module 124 operationally maps geographic coordinates of business objects to coverage areas associated with cellular identifiers (Cell-IDs) so as to enable a determination as to whether a cellular identifier (Cell-ID) should be associated with a particular business object or not. The cellular identifier mapping module 124 further includes a polygon calculation module 126 that is utilized to provide an estimate of an area that is included within the coverage area of a mobile base station having a particular Cell-ID.

Figure 2:
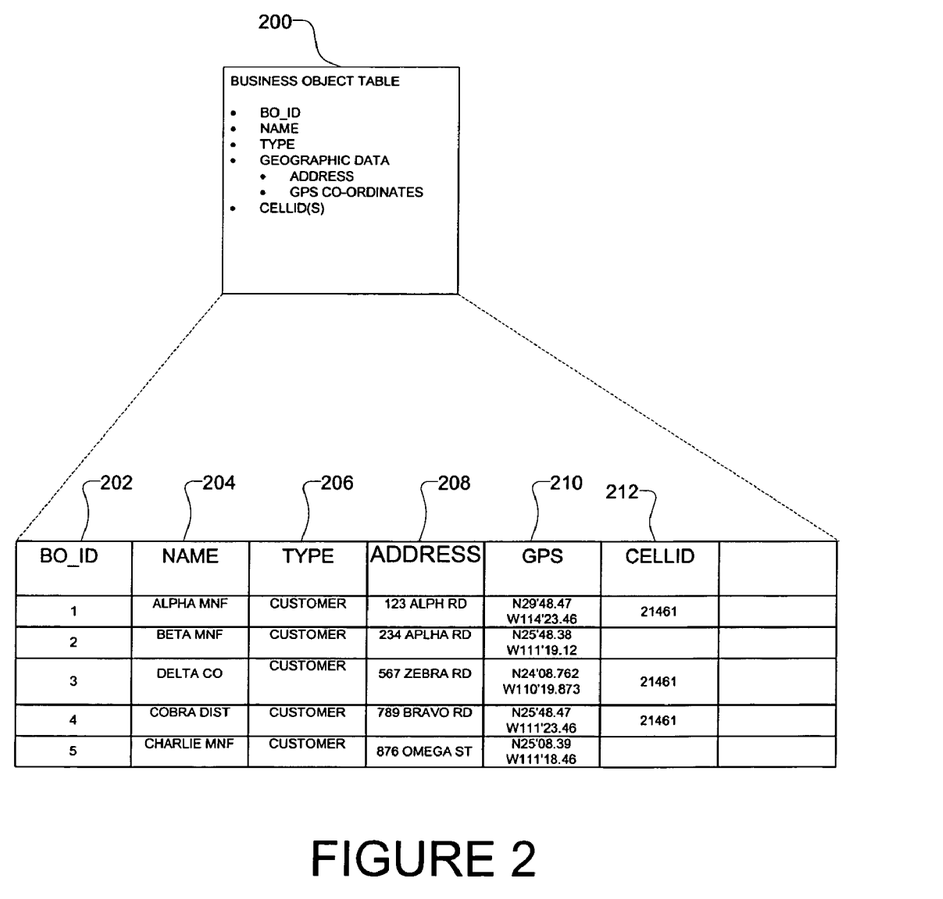
FIG. 2 is an entity relationship diagram illustrating tables that may be included within the business object database, according to an example embodiment.

FIG. 2 is an entity relationship diagram illustrating tables that may be included within the business object database 118, according to an example embodiment. Specifically, a business object table 200.stores a record for each business object utilized by a particular business application (e.g., the sales and order processing application mentioned above with reference to FIG. 1). In the example embodiment, each record may include a business object identifier 202, a business object name 204, a business object type 206, geographic data associated with the business object (e.g., a physical address information 208 and/or GPS coordinates 210 of a location at which the business object is located), and one or more cellular identifiers (Cell-IDs) 212.

Dealing more specifically with the population of the business object table 200 with cellular identifiers (Cell-IDs) 212, the cellular identifier assignment system 120 may assign context information, in the form of a Cell-ID, to an entity, in the form of a business object, based either on context information received in a transmission, or based on an inference regarding the context information. To this end, the cellular identifier assignment system 120 may infer that the relevant business object is located inside a coverage area of a base station associated with the cellular identifier, and then assign the relevant cellular identifier (Cell-ID) to the previously "unassigned" business object. In various embodiments, a cellular identifier assignment system 120 may be invoked upon the occurrence of any one of a number of trigger events, such as whenever a cellular identifier (Cell-ID) is assigned to a business object within the table 200 based on a received transmission, whenever a common cellular identifier (Cell-ID) is assigned more than three business objects, or alternatively, the cellular identifier assignment system 120 may be invoked at fixed time periods (e.g., daily, monthly etc.).

Consider an example in which the underlying business application is a sales and order processing application, and the business objects constitute customers business objects. FIG. 2 illustrates a number of customer names, with the business object type identifying each of the relevant business objects as being a "customer" business object. Furthermore, physical address information 208 is also stored for each business object, as are GPS coordinates 210. Further, it will noted that cellular identifiers (Cell-IDs) 212 are recorded, within the business object table 200, for business objects 1, 3 and 5, whereas business objects 2 and 5 are "unassigned" business objects, in that cellular identifiers (Cell-IDs) have not been assigned thereto. The assignments of the cellular identifiers (Cell-IDs) to business objects 1, 3 and 4 may have occurred, for example, based on a communication received from a mobile application executing on a mobile device at a customer location, the relevant communication including both a cellular identifier (Cell-ID) and a business object identifier. The receipt of the business object identifier, together with the Cell-ID, enables the business object localization module 116 to include the relevant cellular identifier (Cell-ID) 212 within the record for the business object.

Figure 3:
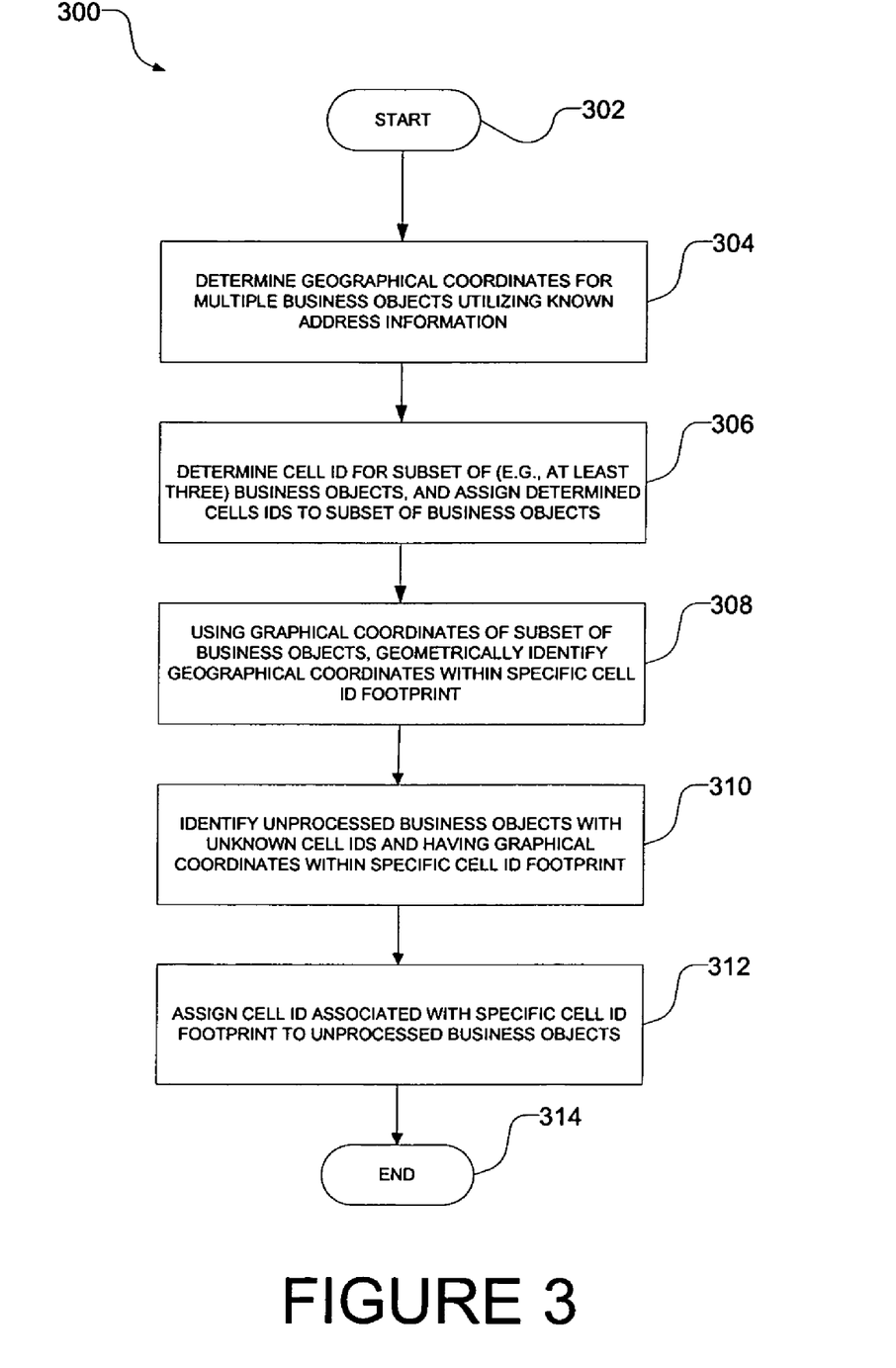
FIG. 3 is a flow chart illustrating a method, according to an example embodiment, to automatically associate context information with entity information.

FIG. 3 is a flow chart illustrating a method 300, according to an example embodiment, to automatically associate context information with entity information. The example embodiment described below uses business objects as examples of entity information, and cellular identifiers (Cell-IDs) as examples of context information.

The method 300 commences at operation 302, and proceeds to operation 304. At operation 304, geographical coordinates for multiple business objects, within the business object table 200, are determined utilizing known physical address information. For example, as shown in FIG. 2, address information is typically known for "customer" business objects. Geographic coordinates, in the exemplary form of GPS coordinates 210, may be determined from the physical address information for each "customer" business object. To this end, in one embodiment, the geographic coordinates determination module 122 of a business application may communicate the address information 208 to the geographic coordinates service 130 via the network 106, as shown in FIG. 1. The geographic coordinates service 130 (e.g., a GPS coordinates database) may then return the GPS coordinates to the application server 114, and the business object localization module 116 may then write these GPS coordinates into the business object table 200 to thereby generate the GPS coordinate data 210 reflected in FIG. 2. As shown in FIG. 2, the GPS coordinates may be obtained for both a first set of business objects that have each been associated with a respective cellular identifier (Cell-ID), and a further set of business objects that have not been associated with a specific cellular identifier (Cell-ID). Accordingly, in one embodiment, the determination of the geographic coordinates for each of a number of business objects may include providing physical address information for each of multiple business objects to a geographic coordinates service, and receiving geographic coordinate information from the geographic coordinates service, at the business object localization module 116.

At operation 306, the business object localization module 116 determines the cellular identifier (Cell-ID) for each business object of a subset of the business objects stored within the business object database 118, and proceeds to assign the identified cellular identifiers (Cell-IDs) to the relevant subset of business objects. For example, a mobile application client 112, executing on a mobile device 102 within the coverage area of a particular base station 104 may determine the cellular identifier (Cell-ID) of the base station 104 with which the mobile device 102 is communicating. This determined cellular identifier (Cell-ID) may be communicated in conjunction (or association) with an identifier for a business object at or near which the mobile device 102 is operating. For example, where the mobile application client 112 is a component of a sales and order processing application, the cellular identifier (Cell-ID) may be captured at a customer location, and then communicated together with an identifier for the relevant customer to the business object localization module 116. The module 116 then records the relevant cellular identifier (Cell-ID) 212 within the business object table 200 in a record for the relevant customer.

At operation 308, the cellular identifier mapping module 124 geometrically identifies geographical coordinates within a cellular coverage area, associated with a particular cellular identifier. The cellular identifier mapping module 124 may identify three or more business objects, within the business object table 200, that have been assigned a common cellular identifier (Cell-ID) 212. Utilizing the geographic coordinates of the three or more business objects assigned to the common cellular identifier (Cell-ID), the cellular identifier mapping module 124, and specially the polygon calculation module 126, may identify the coordinates of a geographic area (e.g., defined by the polygon) that are known (or at least strongly suspected) to be within the cellular coverage area of a base station associated with the relevant cellular identifier (Cell-ID). To this end, in one example embodiment, the polygon calculation module 126 may utilize a convex hull (or convex envelope) calculation to determine geographic coordinates that are within the cellular coverage area.

Figure 4:
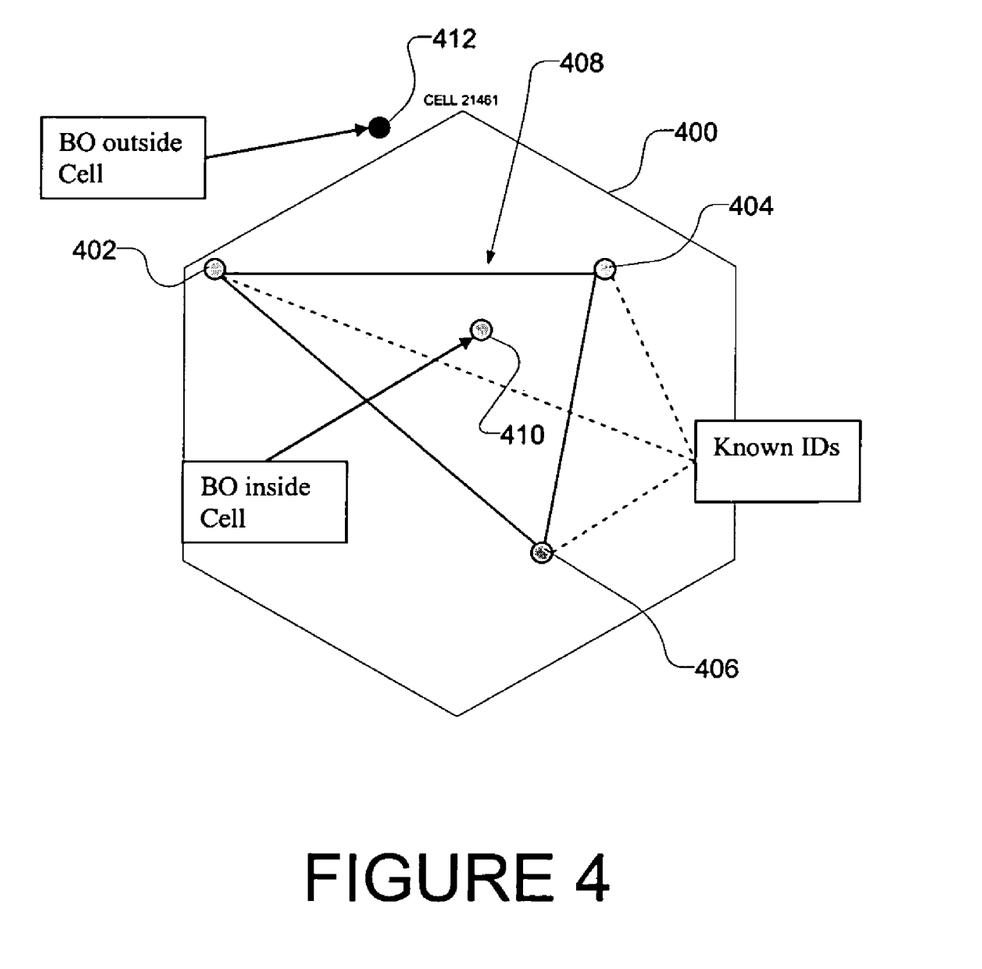
FIG. 4 is a schematic diagram, illustrating an example identification of geographic coordinates within a coverage area associated with a cellular identifier.

FIG. 4 is a schematic diagram, illustrating an example identification of geographic coordinates within a coverage area (e.g., a footprint) associated with a cellular identifier. A cellular coverage area 400 is represented, in FIG. 4, by a hexagon having well defined boundaries. However, in practice, it should be realized that the boundaries of any particular cellular coverage area may not be as definitely determinable, and the shape of a coverage area may vary substantially depending on terrain and base station characteristics.

The geographic coordinates of three business objects are depicted at 402, 404 and 406, each of the relevant business objects having a known and common cellular identifier. As a result of the cellular identifiers at each of the geographic coordinates 402, 404 and 406 being known, an embodiment assumes that each of these geographic locations are within the coverage area 400 of the known Cell-ID. A polygon, in the exemplary form of a triangle 408, may then be calculated utilizing the geographic coordinates 402, 404 and 406 to define a geographic area (e.g., the triangle 408) that may be assumed to fall within the coverage area 400.

Returning to FIG. 3, at operation 310, the cellular identifier mapping module 124 proceeds to identify unprocessed or "unassigned" business objects to which cellular identifiers (Cell-IDs) have not been assigned, but which have graphical coordinates that are known to correspond to geographical coordinates that were determined, at operation 308, to fall within a cellular coverage area 400. For example, all "unassigned" business objects for which the geographical coordinates, determined at operation 304, fall within the triangle 408, may be identified at operation 310. Referring again to FIG. 4, the geographic coordinates 410 of a specific business object, to which a cellular identifier (Cell-ID) has not been assigned, may be determined at operation 310 to correspond to geographic coordinates identified as falling within the cellular coverage area 400 as a result of being included within the triangle 408. On the other hand, the coordinates 412 of a further business object, to which a cellular identifier (Cell-ID) has also not been assigned, would not be identified at operation 310, as the coordinates 412 fall outside the triangle 408.

In summary, the operation performed at operation 310 may include comparing the geographic coordinates of an "unassigned" business object to coordinates of a geographic area defined by a polygon at operation 308, and determining whether the geographic coordinates of the "unassigned" business object are located within the geographic area defined by the polygon.

At operation 312, the cellular identifier mapping module 124 proceeds to assign cellular identifiers (Cell-IDs) to each of the "unassigned" business objects identified at operation 310. To this end, the cellular identifier mapping module 124 may write a cellular identifier 212 into the business object table 200 to thereby assign a cellular identifier (Cell-ID) to the relevant business object. Were, for example, the business object "2" within the business object table 200 to be identified as being located within the coverage area of the cellular identifier (Cell-ID) "21461", this value would then be written into the business object record for this business object within the table 200.

The method 300 then terminates at operation 314.

In various example embodiments, the operations performed at operations 310 and 312 may be performed responsive to any one of a number of trigger events, including responsive to the assignment of a cellular identifier (Cell-ID) to the business object within the business object table 200 (e.g., as may occur at operation 306), responsive to the assignment of a threshold (or predetermined) number of cellular identifiers to business objects (e.g., 3) within a predetermined time period (e.g., within a day), or responsive to the passing of a predetermined time period (e.g. an hour, a day, a month etc.).

In order to calculate a polygon shown in FIG. 4, the geographic coordinates of at least three business objects, with known cellular identifiers (Cell-IDs), may be sued. It will of course be appreciated that the greater the number of business objects associated with a particular cellular identifier (Cell-ID), the more positively and accurately the coverage area associated with a particular cellular identifier (Cell-ID) may be determined.

Figure 5:
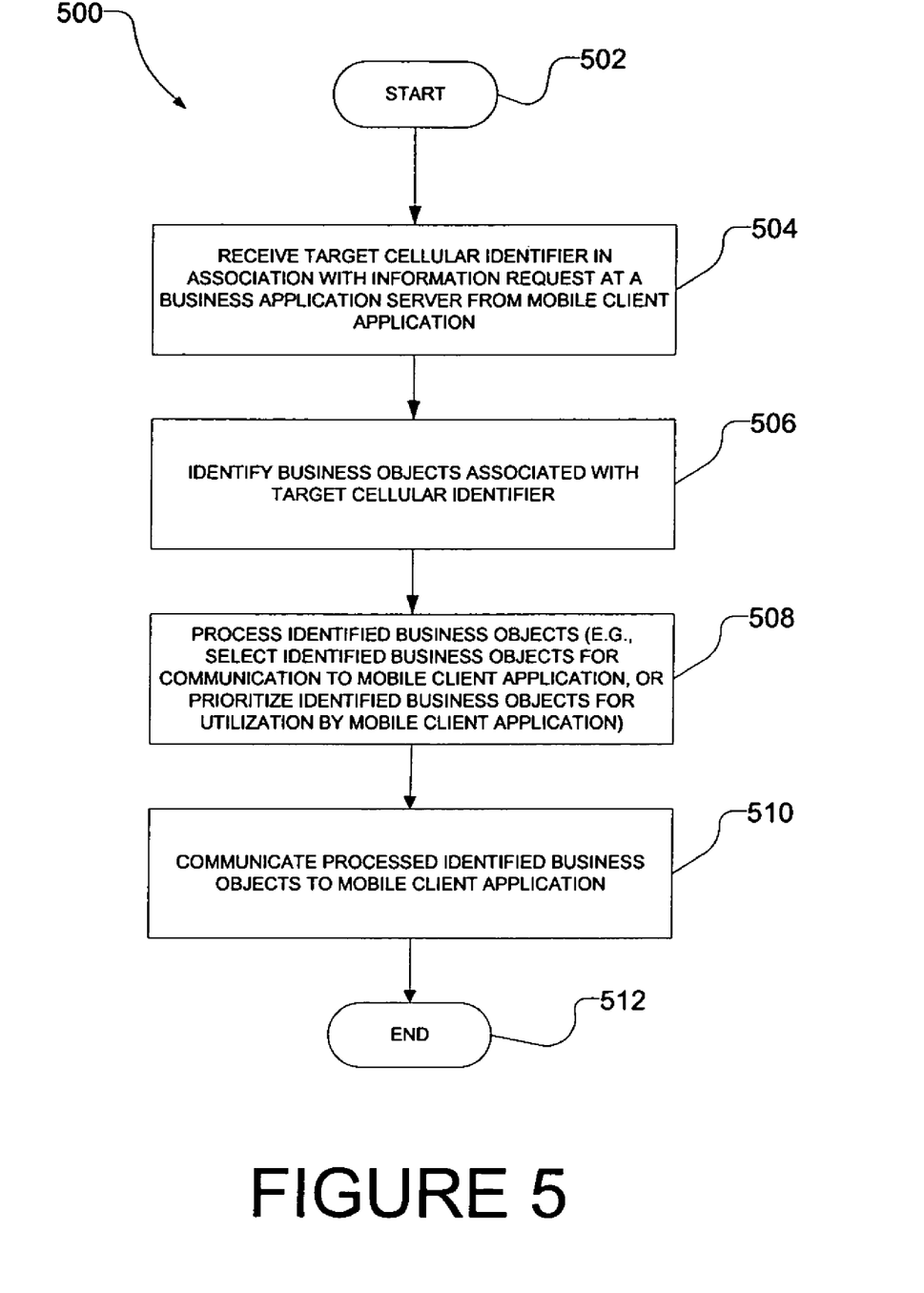
FIG. 5 is a flow chart illustrating a method, according to an example embodiment, to utilize location-enhanced entity data to deliver services or increase functionality provided to a mobile application client.

FIG. 5 is a flow chart illustrating a method, according to an example embodiment, to utilize location-enhanced entity data to deliver services or increased functionality to a mobile application client 112, for example. The method 500 commences at operation 502, then progresses to operation 504 with the receipt of a target cellular identifier (Cell-ID), in association with an information request, at a server component of a business application. The target cellular identifier (Cell-ID) may be received from an associated mobile component (e.g., the request may be received at the application server 114 from the mobile application client 112). Where, for example, the relevant application is a sales and order processing application, the mobile application client 112 may capture the cellular identifier (Cell-ID) of a base station 104 with which it is communicating at a particular location, and communicate this cellular identifier (Cell-ID) to the application server 114 in a request for a list of customer identifiers. The list of customer identifiers may be requested in order to present this list to a sales representative, who can then select a particular customer from this list as a party to a transaction.

The target cellular identifier (Cell-ID), having been received by the application server at operation 504, is then communicated to the business object localization module 116 at operation 506. The business object localization module 116 then identifies business objects associated with the target cellular identifier (Cell-ID). To this end, the business object localization module 116 may access the business object database 118, and retrieve records for all business objects corresponding to the target business object.

At operation 504, the business object localization module 116 proceeds to process the identified business objects. For example, the business object localization module 116 may select the identified business objects for communication from the application server 114 to the mobile application client 112, in order to be presented to a user for further processing or interaction. In an embodiment, the business object localization module 116 may also prioritize the identified business objects for utilization by the mobile application client 112 or initiate further automatic processing (e.g., time recording).

Moving on to operation 510, the business object localization module 116 then proceeds to communicate the processed business objects, via the network 106 and the base station 104, to the mobile application client 112. The method 500 then terminates at operation 512.

Figure 6:
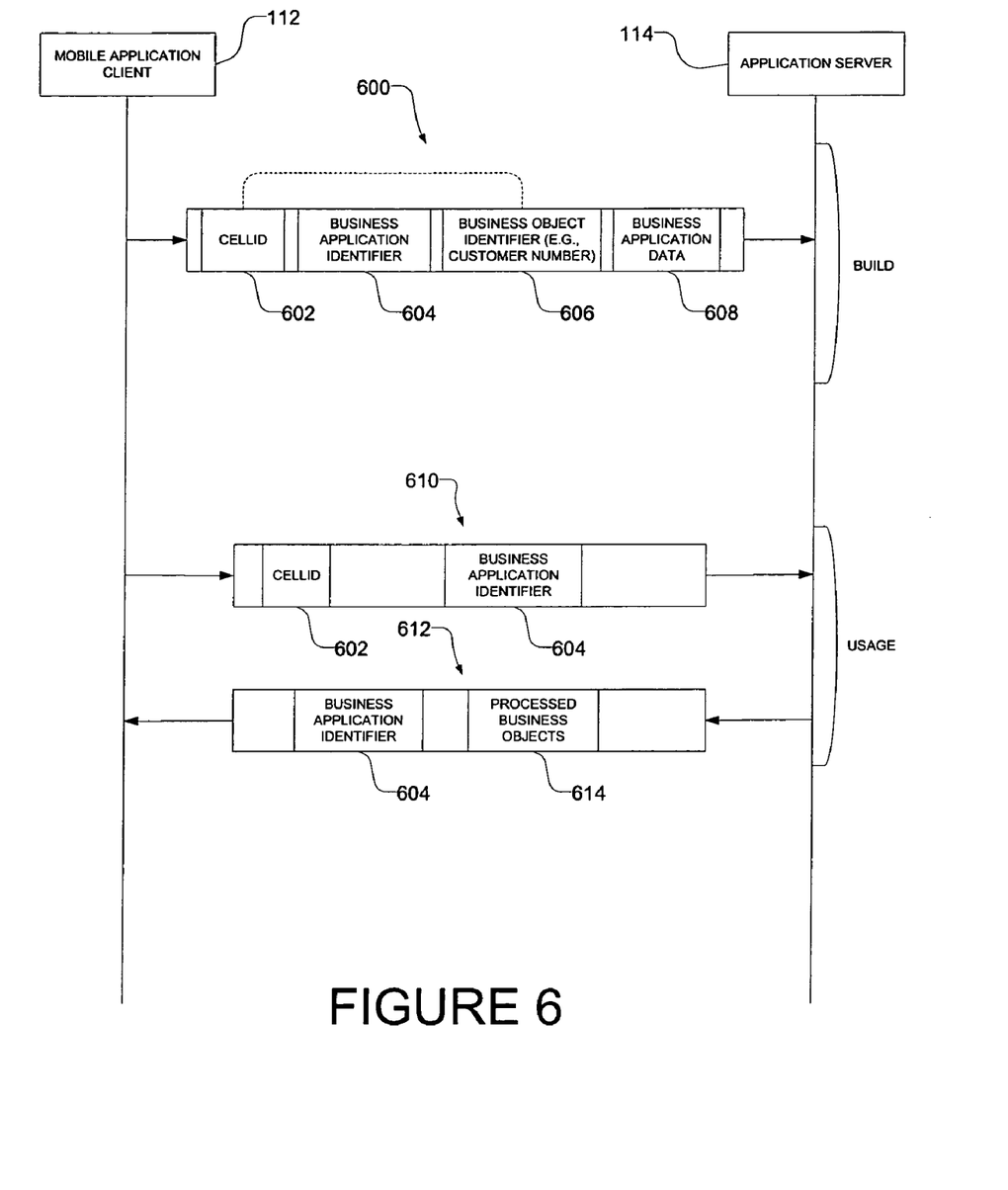
FIG. 6 is a block diagram further illustrating contents of various communications (e.g. messages) that may be communicated between the mobile application client and the application server, in one example embodiment.

FIG. 6 is a block diagram further illustrating the contents of various communications (e.g. messages) that may be communicated between the mobile application client 112 and the application server 114, in one example embodiment. The contents of communications that contribute towards a build operation, and the contents of communications that occurred during a usage operation, are distinguished in FIG. 6. Specifically, a first communication 600, from the mobile application client 112 to the application server 114, during a build operation (e.g., as may occur at operation 306) is shown to include a cellular identifier (Cell-ID) 602, as determined by the mobile application client 112, a business application identifier 604 (e.g., identifying a particular sales and order processing application), a business object identifier 606 (e.g., a customer number) and other application data 608 (e.g., details regarding an order, such as item, volume, price, delivery date etc.). As shown in FIG. 6, the inclusion of the cellular identifier (Cell-ID) 602 and the business object identifier 606 within a single communication so as to associate the cellular identifier (Cell-ID) 602 with the business object identifier, allows the cellular identifier assignment system 120 to assign the relevant cellular identifier (Cell-ID) to the appropriate business object within the business object table 200, based on receipt of the message 600.

During a usage operation, supported by the business object localization module 116 of the application server 114, a request message 610 may be communicated from the mobile application client 112 to the application server 114. The request message includes a cellular identifier, again determined by the mobile application client 112 and, optionally, a business application identifier 604. Responsive to receipt of the request message, the application server 114 may transmit a response message 612 back to the mobile application client 112. The response message 612 again includes a business application identifier 604 (e.g., identifying the sales and order processing application) and one or more processed business objects 614 as may be generated at operation 508 described above with reference to FIG. 5. For example, the processed business objects 614 may include a selected group of business objects associated with the cellular identifier (Cell-ID) 602, or a prioritized group of business objects.

In addition to merely processing business objects, as described above with reference to FIG. 5, the business object localization module 116 may communicate, to the mobile application client 112, information that is supplemental to the business object data and that is context (e.g., location) driven.

While the above example embodiment has been discussed within the context of a business application, it will be appreciated that other embodiments may find application in a wide variety of environments and for a wide variety of uses. For example, an example embodiment may be utilized to deliver a list of tourist locations to a user, responsive to receiving a request from the user that includes a particular cellular identifier (Cell-ID). In this case, a prioritized list of tourist locations could be identified and communicated back to a mobile application client. Similarly, a request to identify nearby restaurants may be received from a mobile application client, this request again including a cellular identifier (Cell-ID). Responsive to receipt of this request, the application server 114 may return a list of restaurants that are known to be within the coverage area of a base station associated with the cellular identifier (Cell-ID).

One example advantage of the embodiment described above is the accelerated population of a database of entity information with context information (e.g., cellular identifiers (Cell-IDs)). For example, once the cellular identifiers (Cell-IDs) of three or more entities are known, the geographic coordinates associated with those three known entities may be determined, and other entities within the coverage area of the relevant cellular identifier (Cell-ID) may be determined, again utilizing the geographic coordinates of the "unassigned" entities. For example, where the cellular identifiers (Cell-IDs) associated with three restaurants in a particular area are known, cellular identifiers (Cell-IDs) may be inferred for a number of other restaurants within the cellular coverage area of a particular base station, without having received a communication from a mobile device known to be located at these further restaurants.

In one embodiment, the present invention may find application where the entities, for which records are maintained in a database, are relatively location stable or geographically fixed, and for which identifiers (e.g. cellular identifiers (Cell-IDs) or other and wireless network identifiers) associated with the coverage area would not change with any great frequency.

Figure 7:
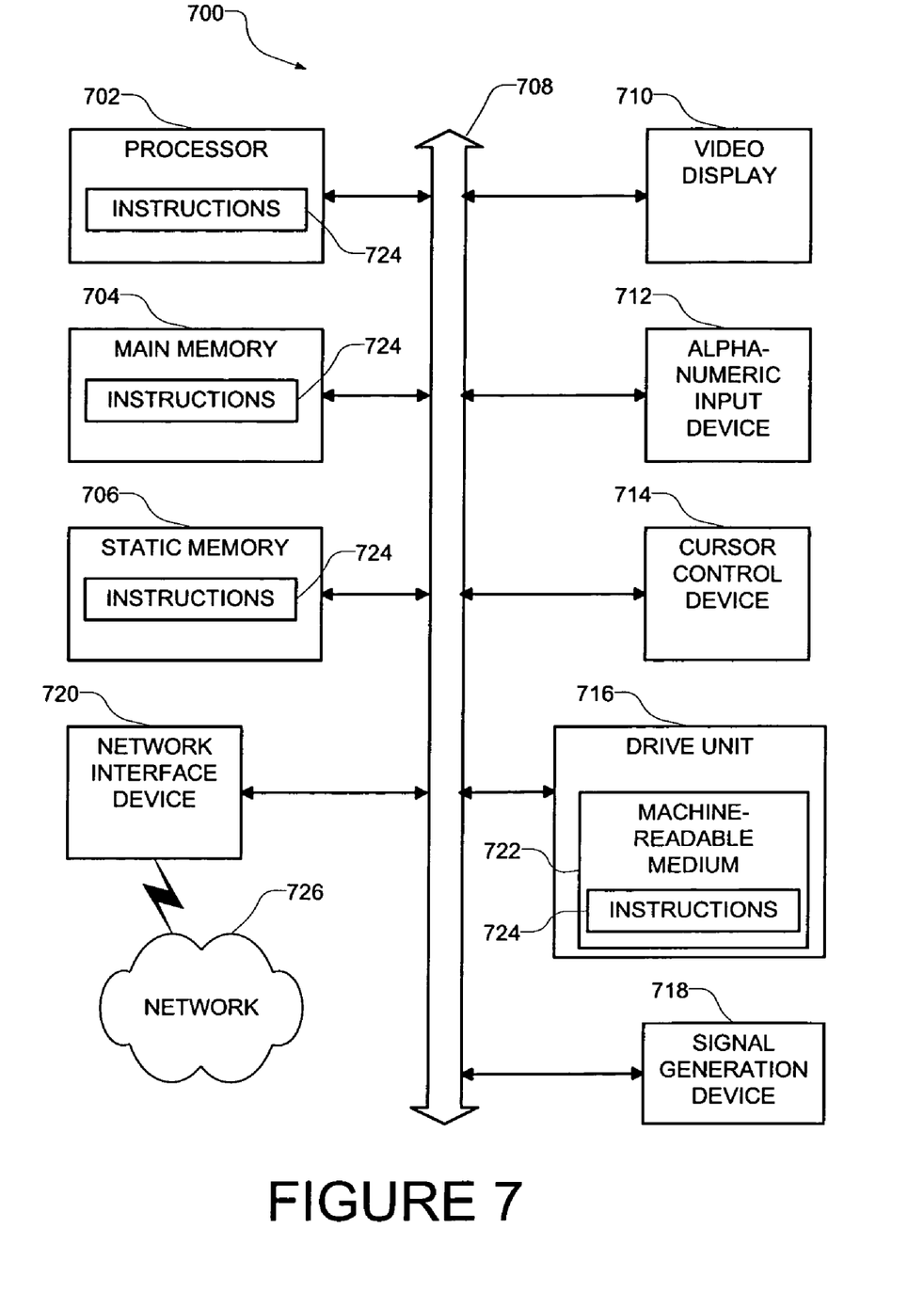
FIG. 7 shows a diagrammatic representation of machine in the example form of a computer system within which a set of instructions, for causing the machine to perform any one or more of the methodologies discussed herein, may be executed.

FIG. 7 shows a diagrammatic representation of machine in the example form of a computer system 700 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions and data structures (e.g., software 724) embodying or utilized by any one or more of the methodologies or functions described herein. The software 724 may also reside, completely or at least partially, within the main memory 704 and/or within the processor 702 during execution thereof by the computer system 700, the main memory 704 and the processor 702 also constituting machine-readable media.

The software 724 may further be transmitted or received over a network 726 via the network interface device 720 utilizing any one of a number of well-known transfer protocols (e.g., HTTP).

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

REFERENCE INDEX 100 system
102 mobile device 104 mobile base station
106 network
108 server system
110 database
112 mobile application client
114 application server
116 business object localization module
118 business objects database
120 cellular identifier assignment system
122 geographic coordinates determination module
124 cellular identifier mapping module
126 polygon calculation module
130 geographic coordinates service
200 business object table
202 business object identifier
204 business object name
206 business object type
208 physical address information
210 GPS coordinates
212 cell-ids
300 method
302 operation
304 operation
306 operation
308 operation
310 operation
312 operation
314 operation
400 cellular coverage area
402 geographic coordinates
404 geographic coordinates
406 geographic coordinates
408 triangle
410 geographic coordinates
412 coordinates
500 method
502 operation
504 operation
506 operation
508 operation
510 operation
512 operation
600 first communication
602 cell-id
604 business application identifier
606 business object
608 other application data
610 request message
612 response message
614 processed business object
700 computer system
702 processor
704 main memory
706 static memory
708 bus
710 video display unit
712 alphanumeric input device
714 user interface UI navigation device
716 disk drive unit
718 signal generation device
720 network interface device
722 machine-readable medium 724 software (3)
726 network

What is claimed is:

1. A computer-implemented method comprising:
determining geographic coordinates of a plurality of entities, the plurality of entities including a first set of entities that have each been associated with a respective context information item and a second set of entities that have each not been associated with a respective context information item;
utilizing the geographic coordinates of the first set of entities, identifying geographic coordinates located within a first geographic area associated with a first context information item;
utilizing the geographic coordinates of the second set of the entities, identifying a first entity of the second set of entities that is located within the first geographic area associated with the first context information item, wherein the identification of the first entity is performed responsive to an assignment of more than a threshold number of context information items to entities of the first set of entities; and
associating the first entity with the first context information item.

2. The method of claim 1, wherein the plurality of entities comprises a plurality of business objects, the first context information item comprises a first cellular identifier, and the first geographic area is located within a first cellular coverage area.

3. The method of claim 1, including:
receiving, at an application server, context information items from mobile devices connected through a mobile communications network to the application server; and
associating the context information items with the first set of entities responsive to the receipt thereof by the application server.

4. The method of claim 1, wherein the determination of the geographic coordinates of the plurality of entities includes:
communicating address information for each of the plurality of entities to a geographic coordinates service; and
receiving the geographic coordinates from the geographic coordinates service.

5. The method of claim 4, the geographic coordinates are Global Positioning Service (GPS) coordinates.

6. The method of claim 1, wherein the identifying of the geographic coordinates located within a first geographic area includes:
geometrically identifying the geographic coordinates located within the first geographic area.

7. The method of claim 6, wherein the geometric identification of the geographic coordinates located within the first geographic area includes:
calculating a polygon, defining the first geographic area, utilizing the geographic coordinates of at least three entities of the first set of entities.

8. The method of claim 7, wherein the identification of the first entity of the second set of entities that is located within the first geographic area includes:
comparing geographic coordinates of the first entity to the geographic area defined by the polygon; and
determining that the geographic coordinates of the first entity are located within the first geographic area defined by the polygon.

9. The method of claim 1, wherein the identification of the first entity is performed responsive to an assignment of a context information item to an entity of the first set of entities.

10. The method of claim 1, wherein identification of the first entity is performed on a periodic basis.

11. The method of claim 1, including:
receiving a target context information item in association with an information request from a mobile client application executing on a mobile device;

identifying entities of the plurality of entities that are associated with the target context information item; and processing the identified entities for communication to the mobile client application.

12. The method of claim 11, wherein the processing of the identified entities includes selecting the identified entities for communication to the mobile client application.

13. The method of claim 11, wherein the processing of the identified entities includes prioritizing the identified entities for utilization by the mobile client application.

14. A system comprising:

a business application server to host a business application a database to store a plurality of business objects of the business application;

a geographic coordinates determination module to determine geographic coordinates of the plurality of business objects, the plurality of business objects including a first set of business objects each associated with a respective cellular identifier and a second set of business objects each not associated with a respective cellular identifier; and a cellular identifier assignment module to:

determine geographic coordinates located within a first cellular coverage area associated with a first cellular identifier, utilizing the geographic coordinates of the first set of business objects;

identify a first business object of the second set of business objects that is located within the first cellular coverage area associated with the first cellular identifier, utilizing the geographic coordinates of the second set of the business objects, wherein the identification of the first business object is performed responsive to an assignment of more than a threshold number of cellular identifiers to business objects of the first set of business objects; and associate the first business object with the first cellular identifier.

15. The system of claim 14, wherein the cellular identifier assignment module is to receive cellular identifiers associated with the first set of business objects from mobile devices connected through a cellular network to the business application server, and to associate the cellular identifiers with the first set of business objects.

16. The system of claim 14, wherein the geographic coordinates determination module is to:

provide address information for at least one of the plurality of business objects to a geographic coordinates service; and receive geographic coordinates for the at least one of the plurality of business objects from the geographic coordinates service.

17. The system of claim 14, wherein the geographic coordinates are Global Positioning Service (GPS) coordinates.

18. The system of claim 14, wherein the cellular identification assignment module is to geometrically identify the geographic coordinates located within the first cellular coverage area.

19. The system of claim 18, wherein the cellular identification assignment module is to calculate a polygon, defining an included geographic area that is within the first cellular coverage area, utilizing the geographic coordinates of at least three business objects of the first set of business objects.

20. The system of claim 19, wherein the cellular identification assignment module is to compare geographic coordinates of the first business object to the included geographic area defined by the polygon, and to determine that the geographic coordinates of the first business object are located within the included geographic area defined by the polygon.

21. The system of claim 14, wherein the business application includes a business object localization module to:

receive a target cellular identifier in association with an information request from a mobile client application executing on a mobile device;

identify business objects of the plurality of business objects that are associated with the target cellular identifier; and process the identified business objects for communication to the mobile client application.

22. A system comprising:

first means for determining geographic coordinates of a plurality of entities, the plurality of entities including a first set of entities that have each been associated with a respective context information item and a second set of entities that have each not been associated with a respective context information item;

second means, utilizing the geographic coordinates of the first set of entities, for identifying geographic coordinates located within a first geographic area associated with a first context information item; and third means, utilizing the geographic coordinates of the second set of the entities, for identifying a first entity of the second set of entities that is located within the first geographic area associated with the first context information item, wherein the identification of the first entity is performed responsive to an assignment of more than a threshold number of context information items to entities of the first set of entities, and for associating the first entity with the first context information item.

23. A machine-readable medium having instructions, that when executed by a machine, cause the machine to perform a method including:

determining geographic coordinates of a plurality of entities, the plurality of entities including a first set of entities that have each been associated with a respective context information item and a second set of entities that have each not been associated with a respective context information item;

utilizing the geographic coordinates of the first set of entities, identifying geographic coordinates located within a first geographic area associated with a first context information item;

utilizing the geographic coordinates of the second set of the entities, identifying a first entity of the second set of entities that is located within the first geographic area associated with the first context information item, wherein the identification of the first entity is performed responsive to an assignment of more than a threshold number of context information items to entities of the first set of entities; and associating the first entity with the first context information item.

* * * * *

UNITED STATES PATENT AND TRADEMARK OFFICE
CERTIFICATE OF CORRECTION

PATENT NO.      : 7,606,583 B2                                           Page 1 of 1
APPLICATION NO. : 11/395713
DATED           : October 20, 2009
INVENTOR(S)     : Axel Spriestersbach It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 726 days.

Signed and Sealed this

Twelfth Day of October, 2010

David J. Kappos
*Director of the United States Patent and Trademark Office*